United States Patent [19]
Allen, II et al.

[11] Patent Number: 5,588,398
[45] Date of Patent: Dec. 31, 1996

[54] REMOTELY CONTROLLED DOG MUZZLE

[75] Inventors: Harvey S. Allen, II, 437 N. Olive, Orange, Calif. 92666; E. William Berke, 2949 Feather Hill, Orange, Calif. 92667; Gary B. Erwin, Ocoee, Tenn.

[73] Assignees: Harvey S. Allen, II; E. William Berke, both of Orange, Calif.; Ken Newgard, Kalispell, Mont.; Nicholas Vertucci, Irvine, Calif.

[21] Appl. No.: 441,423
[22] Filed: May 15, 1995
[51] Int. Cl.⁶ .................................................. A01K 29/00
[52] U.S. Cl. ............................................................. 119/822
[58] Field of Search ................................. 119/822, 718, 119/719, 720, 721

[56] References Cited

U.S. PATENT DOCUMENTS

| | | | |
|---|---|---|---|
| 2,658,478 | 11/1953 | Jones | 119/822 |
| 2,940,425 | 6/1960 | Dykens | 119/822 |
| 4,745,882 | 5/1988 | Yarnall, Sr. et al. | 119/721 |

*Primary Examiner*—Gene Mancene
*Assistant Examiner*—Thomas Price
*Attorney, Agent, or Firm*—William L. Chapin

[57] ABSTRACT

A remotely controllable dog muzzle apparatus includes a cup-shaped snout shield to which is attached an accessory pod provided with stimulus generators such as a stun gun or sensors interactive with a physical environment of a dog fitted with the muzzle. In the preferred embodiment, the pod contains a stun gun having a pair of forward projecting electrodes, and a high voltage power supply having an ON/OFF control terminal connected to an electronic switch controlled by the demodulated output of a radio receiver. The apparatus includes a remote radio transmitter adapted to transmit coded signals on a modulated radio frequency carrier to the receiver, thereby actuating the electronic switch and causing high voltage electrical sparks to arc between the electrodes, the sparks encouraging a suspect to obey orders or have pain inflicted by the electrodes. The pod may optionally contain a loud speaker connected to the receiver, and a microphone and/or television camera connected to an auxiliary transmitter, to permit two-way communications between a remotely located dog handler and a suspect or a search and rescue victim.

27 Claims, 6 Drawing Sheets

REMOTELY CONTROLLED DOG MUZZLE

BACKGROUND OF THE INVENTION

A. Field of the Invention

The present invention relates to apparatus and equipment for use in conjunction with dogs used for guard duties, law enforcement activities and search and rescue operations. More particularly, the invention relates to a dog muzzle having functions and accessories remotely controllable by law enforcement and other authorized personnel.

B. Description of Background Art

Larger, aggressive dogs such as German Shepherds and the like are widely used by police, military and security personnel throughout the world. Such dogs, commonly referred to as police dogs, are used to perform search and rescue activities, and to locate persons suspected of crimes, using their keen sense of smell, hearing and sight. When appropriately trained, police dogs also are effective in subduing suspects, especially those that have attempted to secrete themselves in locations that are difficult to access by police personnel. Thus, police dogs may be used to rout suspects hiding under vehicles, within confined spaces such as tunnels or crawl spaces within buildings, and similar locations. However, there are problems associated with the use of police dogs to apprehend criminal suspects.

Civil and criminal suits have been brought against law enforcement agencies that have employed police dogs which have bitten suspects during their apprehension. Thus, economic considerations alone would be a sufficient motivation to solving the dog bite problem. Moreover, it would be desirable for humanitarian as well as public relations considerations to be able to utilize the unique capabilities of police dogs for apprehending or subduing suspects, without causing physical harm to the suspect. Because of the foregoing concerns, some law enforcement agencies have resorted to equipping their dogs used in police work with muzzles. However, a disadvantage of that approach is the fact that criminal suspects are less likely to submit to apprehension by a dog that is muzzled and therefore unable to bite the suspect. Accordingly, a problem has existed with prior art methods of effectively utilizing police dogs for criminal apprehension and crowd control, while still preventing the dogs from inflicting physical injuries on suspects or members of a crowd. The present invention was conceived of as a solution to that problem.

OBJECTS OF THE INVENTION

An object of the present invention is to provide a dog muzzle that possesses functional capabilities that are remotely controllable by a handler.

Another object of the invention is to provide a dog muzzle including remotely controllable accessories attached to the muzzle.

Another object of the invention is to provide a dog muzzle that includes an attached stun gun having a pair of high voltage electrodes that protrude therefrom, the stun gun being controllable by a remotely located handler to emit sparks useable to warn or shock a suspect, thereby facilitating arrest of the suspect.

Another object of the invention is to provide a dog muzzle having an attached stun gun remotely operable to produce sparks of controllable voltage level.

Another object of the invention is to provide a dog muzzle provided with an attachable pod adapted to contain remotely controllable accessories.

Another object of the invention is to provide a dog muzzle having an accessory pod adapted to contain a radio receiver and loudspeaker permitting a remotely located operator to transmit voice commands from the loudspeaker.

Another object of the invention is to provide a dog muzzle having a radio transmitter and microphone allowing a remotely located operator to receive audio signals from the vicinity of a dog equipped with the muzzle.

Another object of the invention is to provide a dog muzzle having a two-way radio, speaker and microphone allowing two-way communication between a remotely located operator and persons within the immediate vicinity of a dog fitted with the muzzle.

Another object of the invention is to provide a dog muzzle provided with a television camera operably connected to a video signal transmitter that permits a remotely located operator to observe locations pointed to by a dog fitted with the muzzle.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends a novel dog muzzle including an attached accessory pod provided with various devices capable of emitting stimuli or sensing physical parameters within the vicinity of a dog fitted with the muzzle.

In a basic embodiment of the dog muzzle according to the present invention, a perforated cup-shaped shield or snout cover is adapted to fit over the face of a dog. The shield is secured to the dog by a collar strap that fits around the neck of the dog, thereby securing the muzzle in place. Attached to the lower surface of the shield is a "stun gun" having a pair of forward projecting electrodes. The stun gun contains a high voltage power supply having an ON/OFF control terminal connected to an electronic switch controlled by the demodulated output of a radio receiver. A radio transmitter operated by a person located remotely from a dog fitted with the muzzle may be used to transmit coded signals on a modulated radio frequency carrier to the receiver, thereby actuating the electronic switch and causing high voltage electrical sparks to arc between the electrodes. Depending upon the proximity of the dog to a suspect, the suspect may be encouraged to remain stationary to permit his being taken into custody by the threat of being shocked, or being contacted by the arcs to inflict pain if he continues to resist apprehension. In the preferred embodiment, the voltage level between the stun gun electrodes may be varied by coded command signals, thus permitting a remote operator to increase the threat to an uncooperative suspect.

In a modification of the basic embodiment of the invention, the muzzle includes a loudspeaker connected to a radio receiver and attached to the muzzle collar, permitting an operator to speak into a remotely located microphone to facilitate warning a suspect that he will be shocked if the suspect fails to submit.

In another embodiment of the invention useful for search and rescue work, a muzzle pod is provided with a two-way radio that may be used to listen for and communicate with disaster or accident victims. This embodiment may also include a television camera and video transmitter attached to the muzzle, allowing an operator to observe remote locations entered by the dog.

DETAILED DESCRIPTION OF THE PREFERRED EMBODIMENTS

FIGS. 1–6 illustrate a basic embodiment of a novel remotely controlled dog muzzle according to the present invention.

Referring now to FIGS. 1–5, a novel remotely controlled dog muzzle according to the present invention is shown. As may be seen best by referring to FIG. 1, muzzle 20 includes a cup-shaped snout shield 21 that is adapted to fit over the snout or muzzle B of a dog A. Shield 21 is preferably made of a thin sheet of flexible, electrically, non-conducting material such as leather or flexible plastic. As shown in FIGS. 1–5, shield 21 has a generally rectangularly-shaped front wall 22, and symmetrical, trapezoidally-shaped, left and right side walls 23 and 24 that protrude rearwards from the front wall. Side walls 23 and 24 are continuous with and curve initially outwards from front wall 22, and thence inwards from a vertical longitudinal center plane of the shield. Shield 21 also has a generally trapezoidal-shaped bottom wall 25 that protrudes rearward from the front wall and diverges downwards from a horizontal center plane of the shield.

Figure 1:
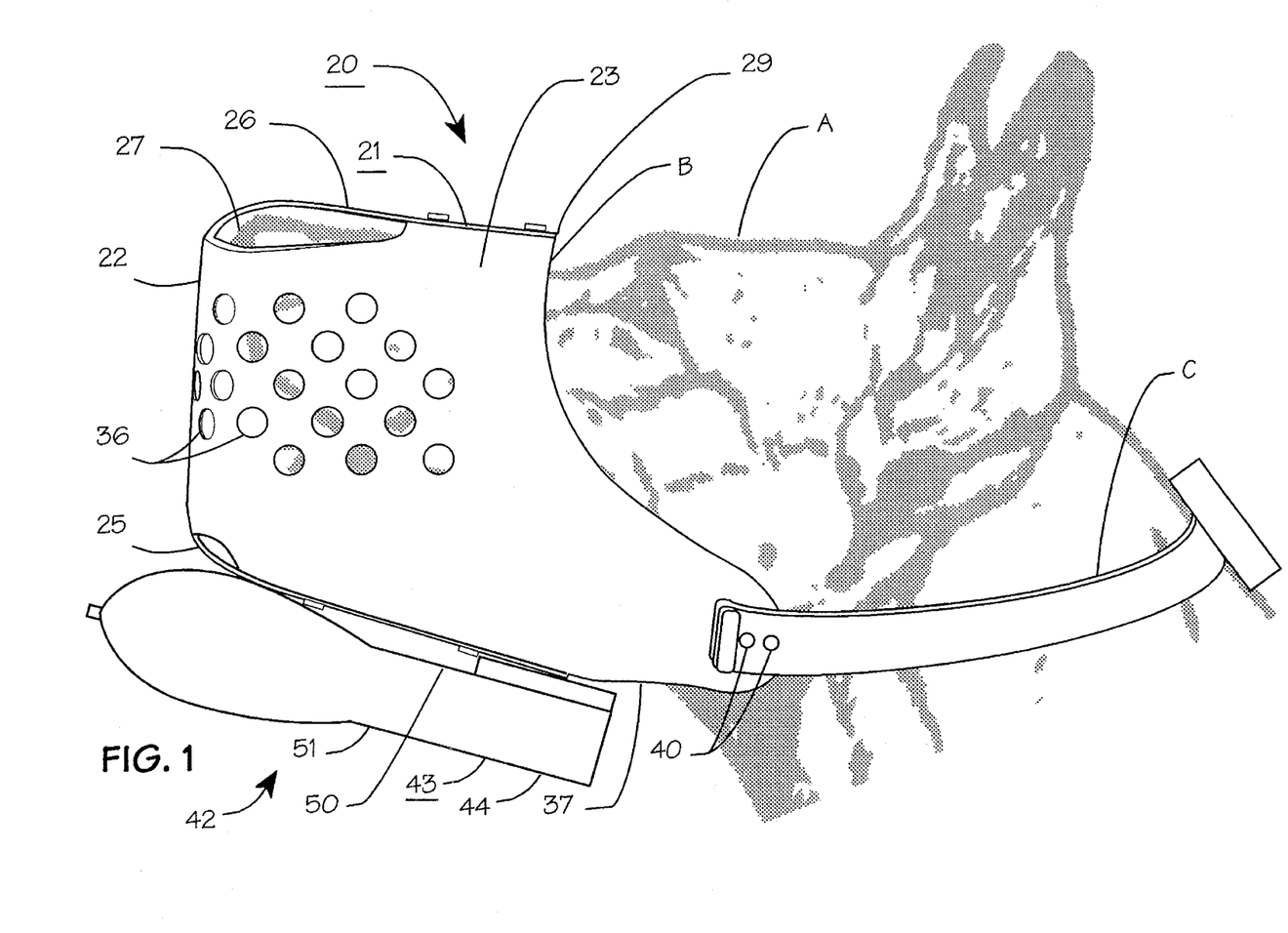
FIG. 1 is a left side elevation view of a novel dog muzzle according to the present invention, showing the muzzle attached to a dog.
Figure 2:
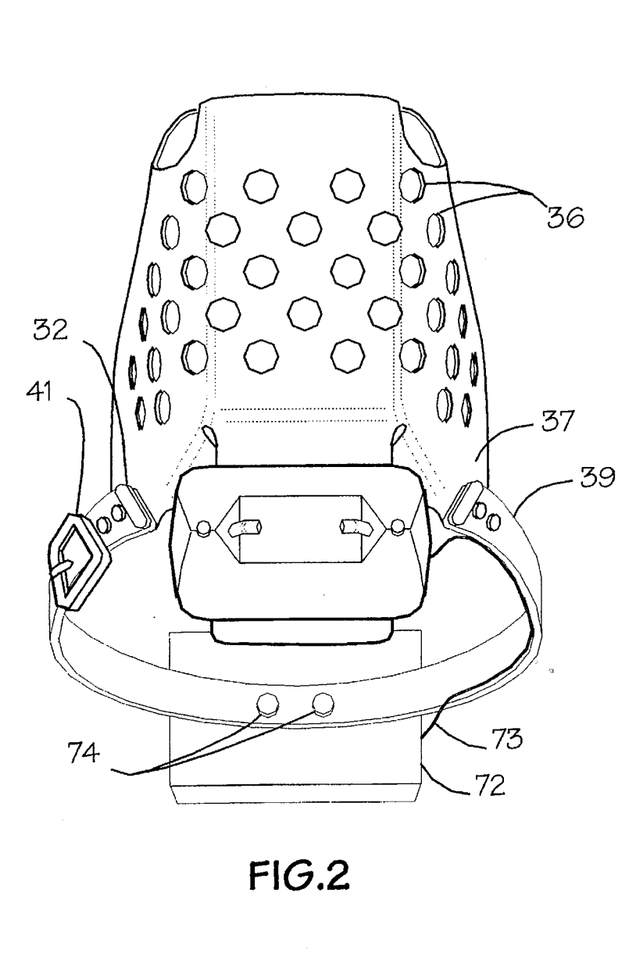
FIG. 2 is a front elevation view of the muzzle of FIG. 1.
Figure 4:
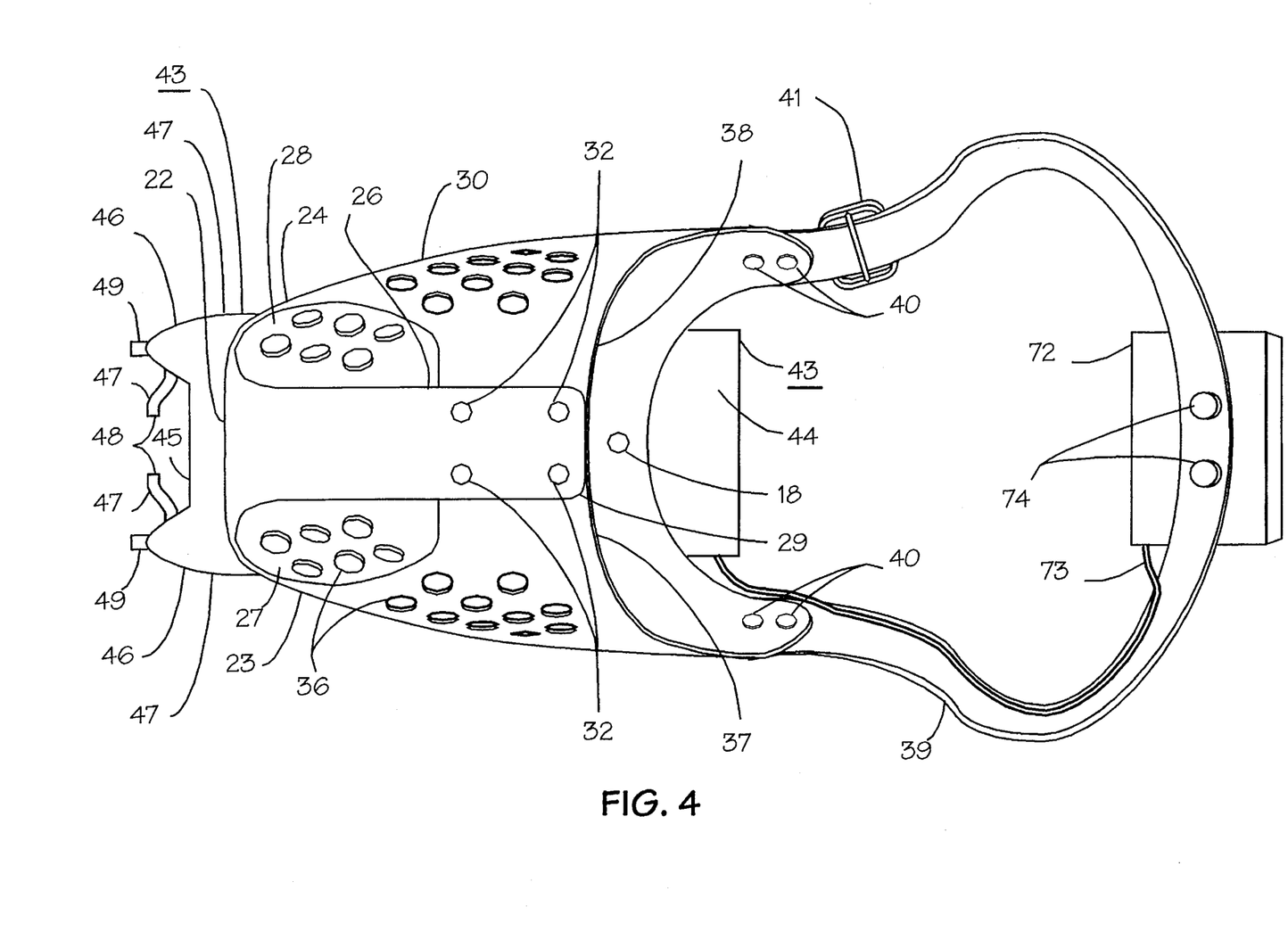
FIG. 4 is an upper plan view of the muzzle of FIG. 1.
Figure 5:
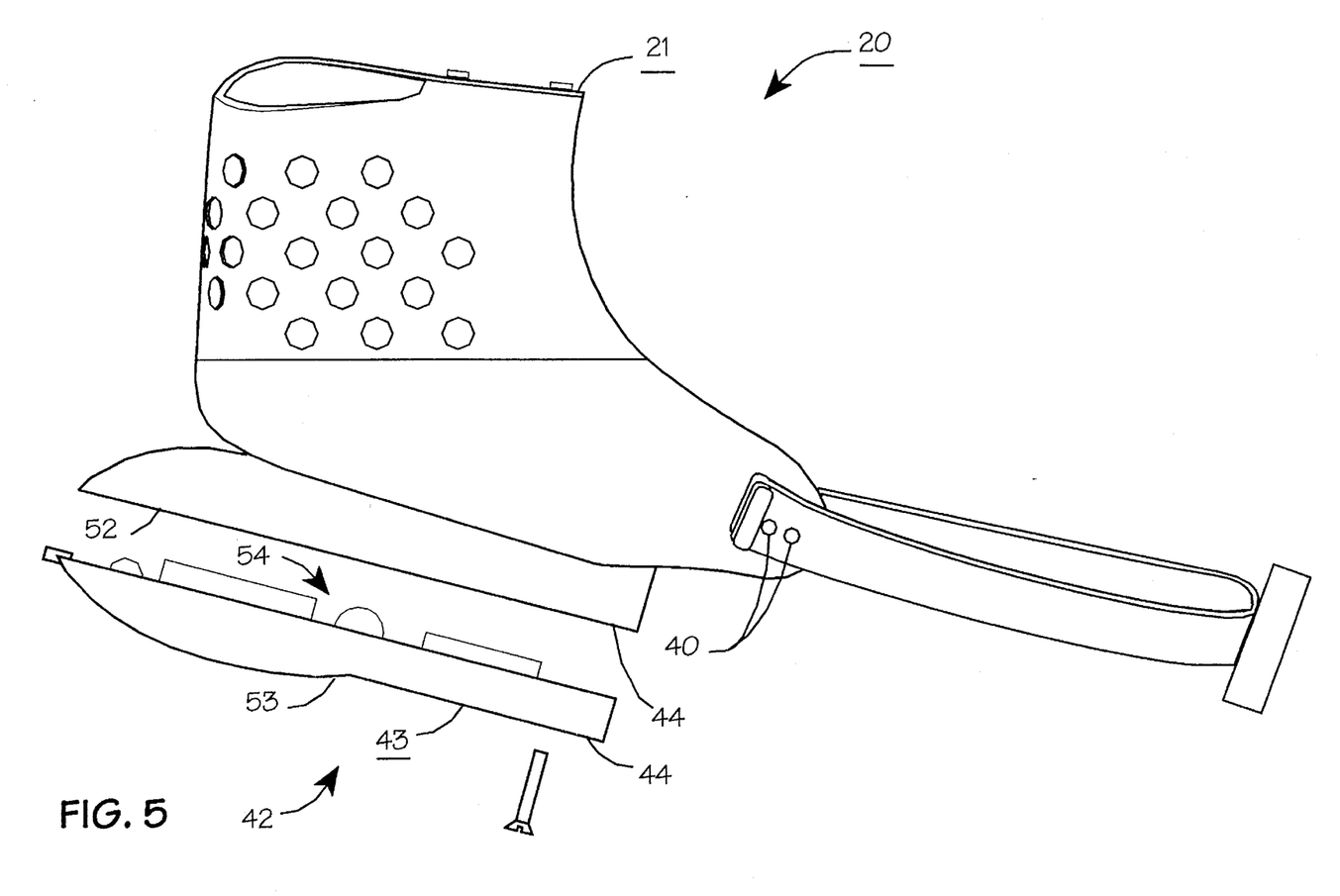
FIG. 5 is a partly exploded view of the muzzle of FIG. 1.

As may be seen best by referring to FIGS. 1 and 4, muzzle shield 21 includes a generally rectangularly-shaped upper wall 26 that protrudes rearward from front wall 22. The width of upper wall 26 is preferably less than the spacing between the front portion of left and right side walls 23 and 24, thus forming with the side walls longitudinally elongated, triangular-shaped left and right vent openings 27 and 28. Upper wall 26 has a transversely disposed rear edge wall 29. Preferably, upper wall 26 is continuous with front wall 22 and is attached to inwardly curving left and right end tabs 30 and 31 continuous with left and right side walls 23 and 24, as by rivets 32. As shown in FIG. 5, side walls 23 and 24 of muzzle shield 21 also preferably have left and right lower inwardly curved end tabs 33 and 34, respectively, that are fastened together by rivets 35.

When constructed as described above, muzzle shield 21 may be fabricated from a thin sheet of leather or PVC plastic, which is initially die cut or molded to make a pre-form which is subsequently bent into shape, and fastened together by means of rivets or similar fastening means. As shown in FIGS. 1 through 5, side walls 23 and 24, and front wall 22 of muzzle shield 21 preferably are provided with a plurality of spaced apart ventilating perforations 36.

As shown in FIGS. 1–5, left and right side walls 23 and 24 of muzzle shield 21 each have at their lower edges and near their intersections with bottom wall 25 rearwardly projecting left and right collar strap tabs 37 and 38, respectively. Muzzle 20 includes a collar strap 39 for attachment around the neck C of a dog A, as shown in FIG. 1. Collar strap 39 is attached at opposite free ends thereof to collar attachment tabs 37 and 38 by rivets 40, or by other convenient means. The free ends of strap 39 are joined by an adjustable buckle 41 to a desired length around the neck C of a dog A.

As may be seen best by referring to FIGS. 1, 4 and 5, dog muzzle 20 includes an accessory pod 42 attached to lower wall 25 of muzzle shield 21. In the embodiment of muzzle 20 shown in FIGS. 1, 2 and 4, accessory pod 42 consists of a remotely operable, electrical arcing device or "stun gun" 43. As may be seen best by referring to FIGS. 1 and 5, stun gun 43 includes an elongated, generally rectangular plan view housing 44. Housing 44 has a transversely disposed front wall 45 that is oriented parallel to front wall 22 of snout shield 21, but protrudes forward beyond the lower edge of the front wall of the snout shield. Stun gun 43 also includes a pair of laterally opposed bosses 46 that are continuous with side walls 44A of the stun gun and protrude forwards beyond front wall 45.

Stun gun 43 includes a pair of transversely disposed, laterally opposed and aligned, circular cross-section electrodes 47 that protrude laterally inwards towards one another from the inner facing lateral walls of bosses 46. The inner facing transverse edge walls 48 of electrodes are spaced symmetrically outwards from a vertical longitudinal center plane of stun gun housing 44.

Stun gun 43 also includes a pair of laterally spaced apart, circular cross-section, longitudinally disposed electrodes 49. Longitudinal electrodes 49 are in parallel alignment with rear upper and lower walls 50 and 51 of housing 44, and are spaced further apart than end walls 48 of transverse electrodes 47.

Each longitudinal electrode 49 is in electrically conductive contact with an adjacent lateral electrode 47. Laterally opposed pairs of longitudinal and lateral electrodes 49 and 47 are in electrically conductive contact with opposite output polarity terminals of a high voltage power supply within stun gun housing 44. The output voltage of the high voltage power supply is sufficient to cause arcing to occur in the air space between inner facing transverse end walls of transverse electrodes 47. When electrodes 49 are placed sufficiently close to even a relatively poorly conducting surface such as human skin, electrical arcs will jump from the longitudinal electrodes to that surface.

As may be seen best by referring to FIG. 5, stun gun housing 44 has hollow upper and lower halves 52 and 53 that enclose components of a high voltage power supply 54. As will now be explained, high voltage power supply 54 of stun gun 43 is operatively interconnected to apparatus that allows the power supply to be turned on and off by a remote operator via a wireless communicating link.

Figure 6:
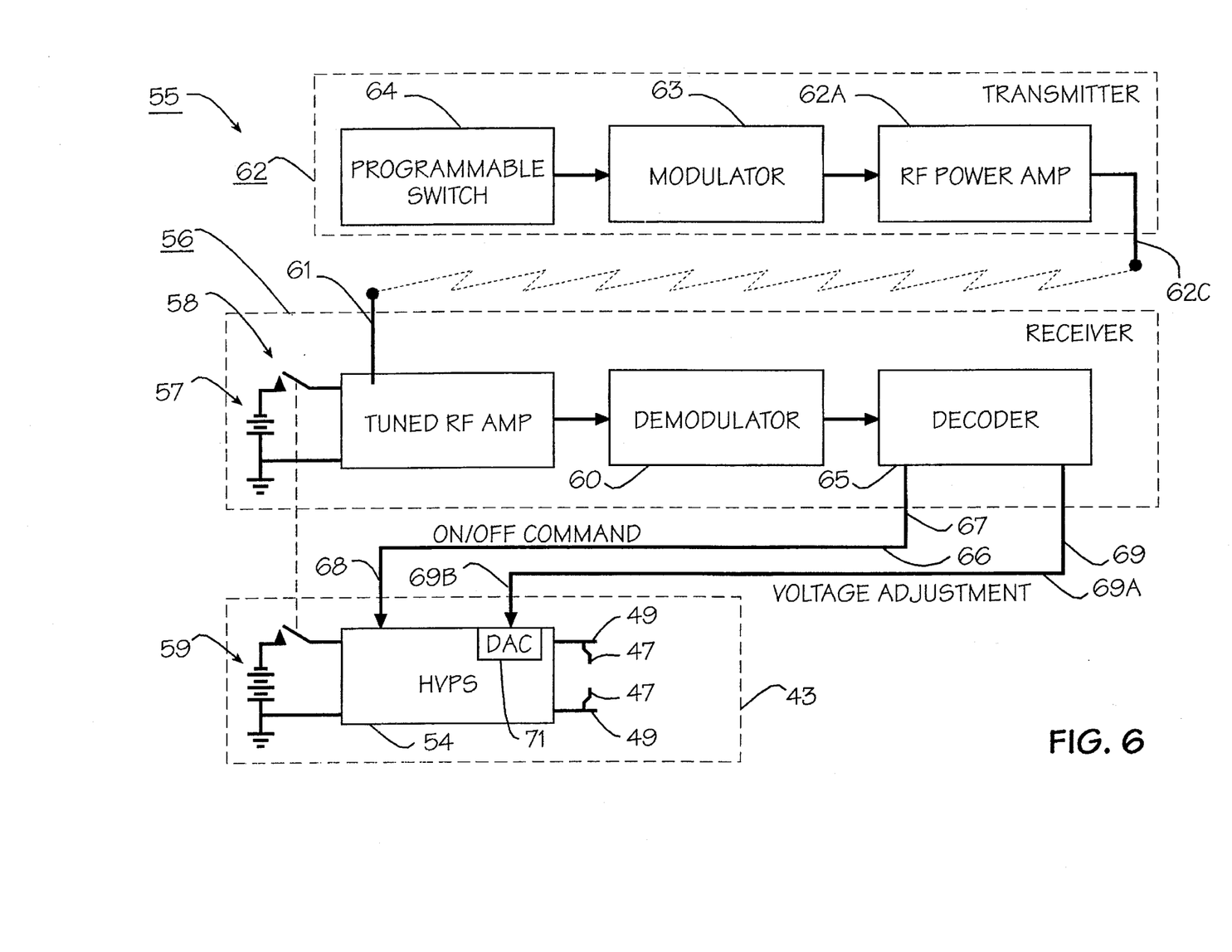
FIG. 6 is a block diagram of electronic components of the apparatus of FIG. 1.

FIG. 6 is a block diagram illustrating the relationship between high voltage power supply 54 and other components of electronic assembly 55 of remotely controlled dog muzzle 20. As shown in FIG. 6, electronic assembly 55 includes a radio receiver 56 powered by a battery 57 connected to the receiver through an ON/OFF switch 58. Preferably, switch 58 has a second set of contacts that connect a heavier duty battery 59 to high voltage power supply 54 of stun gun 43, when radio receiver 56 is turned on.

Radio receiver 56 includes a demodulator 60 that outputs coded digital signals impressed on an RF carrier wave produced by RF power amplifier 62A, outputted on antenna 62B of a remote transmitter 62 and received on antenna 61. Remote transmitter 62 includes a modulator 63 having an input port connected to a programmable switch 64, actuable by a remote operator. Upon entry of a properly coded command signal via programmable switch 64, a decoder 65 connected to receiver demodulator 60 outputs a discrete ON/OFF command signal 66 that is coupled via decoder output terminal 67 to ON/OFF command input terminal 68 of high voltage power supply 54. Receipt of a command signal causes high voltage power supply 54 to output a high voltage pulse of sufficient magnitude to cause an electrical arc discharge to occur between laterally opposed pairs of stun gun terminals 47 and 49.

In the preferred embodiment, electronics assembly 55 of remotely controlled dog muzzle 20 includes means for remotely controlling the magnitude of high voltage arcs emitted by stun gun 43, as well as turning the arcs on or off. Thus, as shown in FIG. 6, receiver decoder 65 of electronics assembly 55 preferably includes in addition to ON/OFF output terminal 67, a second output port 69 that outputs a high voltage level control signal 69A coupled to input port 69B of high voltage power supply 54. In this embodiment, a digital-to-analog converter (DAC) 71 in high voltage power supply 54 is responsive to coded radio frequency signals outputted by transmitter 62 in response to commands entered by a remote operator via switch 64 in controlling the high voltage output from the power supply to predetermined, incrementally adjustable levels. By this means, a remote operator may increase the output voltage of stun gun 43 in a controlled escalation of threats to an uncooperative suspect.

Figure 3:
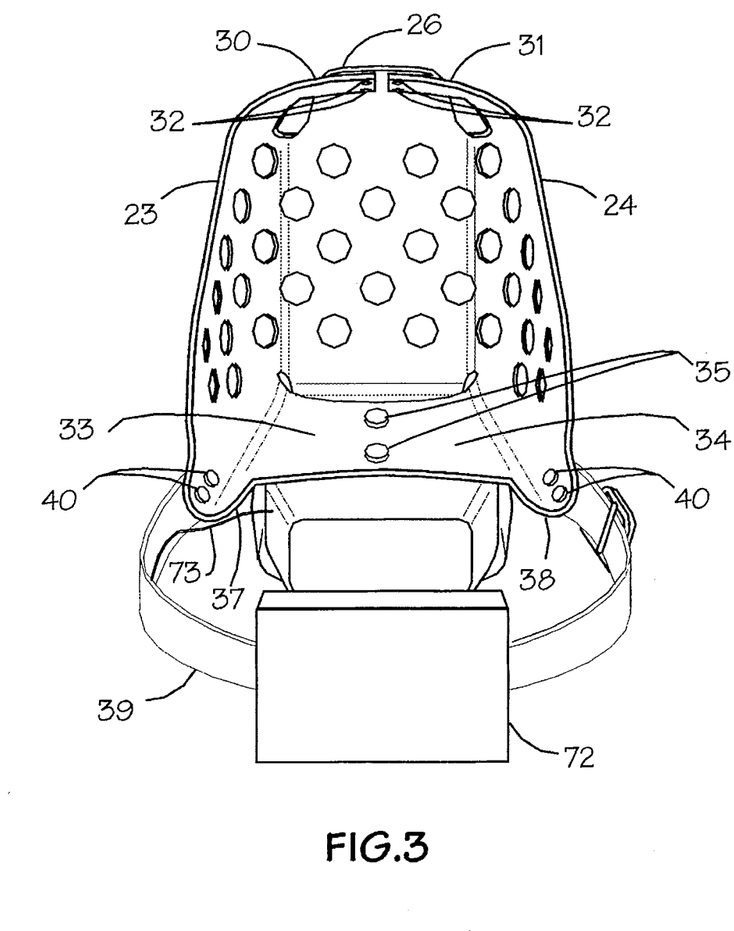
FIG. 3 is a rear elevation view of the muzzle of FIG. 1.

As may be seen best by referring to FIG. 4, electronics assembly 55 of that embodiment of remotely controlled dog muzzle 20 shown in the figure, is preferably partitioned physically into two separate assemblies, including stun gun housing 44, and a receiver assembly housing 72, the two housings being interconnected by a multi-conductor electrical cable 73. As shown in FIGS. 3 and 4, receiver assembly housing 72 is a generally rectangular-shaped, box-like enclosure attached to strap 39 by rivets 74, or any other convenient means.

Figure 7:
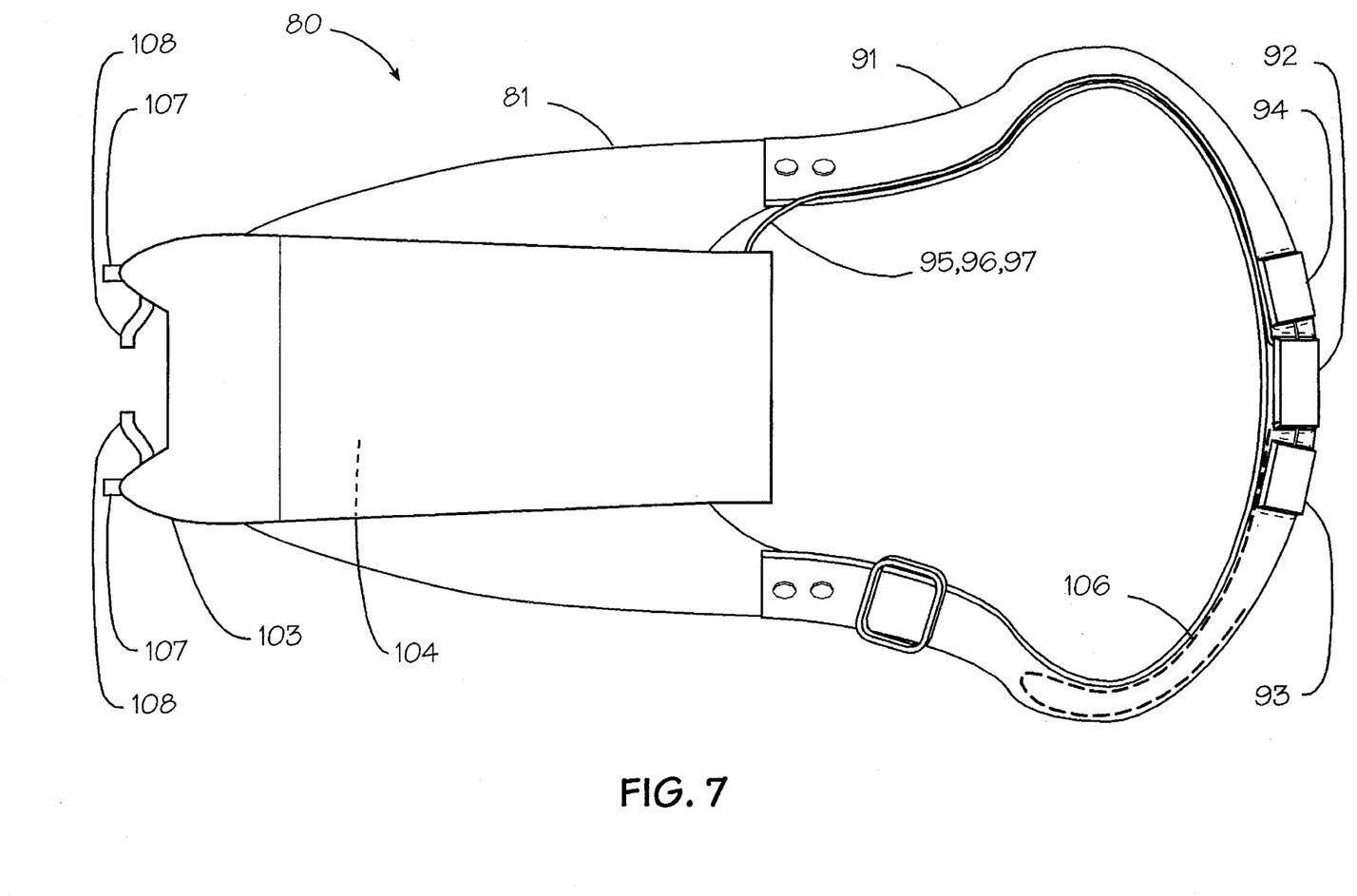
FIG. 7 is a perspective view of a modification of the apparatus of FIG. 1.

FIG. 7 illustrates a modification of the remotely controlled dog muzzle 20 shown in FIGS. 1–4 and described above. As shown in FIG. 7, modified remotely controlled dog muzzle 80 includes a collar 91, and a radio receiver 92, receiver battery 93 and stun gun battery 94 attached to the curved outer surface of the collar. An ON/OFF command conductor 95 and intensity adjust conductor 96 are contained in a cable 97 connected between receiver 92 and a stun gun 103 attached to snout shield 81 of muzzle 80. In a variation of this embodiment, high voltage power supply 104 of stun gun 103 could also be attached to collar 91. In this embodiment, a two conductor high voltage cable connects the output terminals of high voltage power supply 104 to electrode pairs 107 and 108. In this embodiment, housing 104 of stun gun 103 has an empty space which may be occupied by other components such as a loudspeaker, microphone, or TV camera. The loudspeaker may be connected to a third receiver demodulator/decoder channel output port, and used to permit voice communications between a remote dog handler speaking into a microphone connected to the modulator of a remote transmitter. This arrangement permits the dog handler to speak to a suspect for law enforcement purposes, or to a disaster victim in search and rescue operations. A microphone and/or TV camera within housing 104 may be connected to a transmitter attached to muzzle 80, allowing audible and/or visible information in the vicinity of a dog equipped with the muzzle to be transmitted to a remote receiver.

What is claimed is:

1. An apparatus for use with trained dogs comprising;
   a. a stimulus module for producing stimuli perceptible by humans in the presence of the dog, said stimulus module being remotely actuatable,
   b. remote controller means for remotely actuating said stimulus module, and
   c. means for removably attaching said stimulus module to the body of a dog, said means including,
      i. a muzzle including a cup-shaped snout shield,
      ii. means for attaching said muzzle to the body of a dog, and
      iii. means for attaching said stimulus module to said muzzle.

2. The apparatus of claim 1 wherein said stimulus module is further defined as being capable of emitting high-voltage electrical sparks.

3. The apparatus of claim 2 wherein said means for removably attaching said muzzle to the body of a dog is further described as being a collar strap.

4. The apparatus of claim 1 wherein said means for remotely actuating said remote controller means is further defined as being capable of emitting a remote control signal not connected by wires to said stimulus module.

5. The apparatus of claim 4 wherein said remote control signal is further defined as being a radio frequency signal.

6. The apparatus of claim 5 wherein said radio frequency signal is further defined as being coded.

7. The apparatus of claim 4 wherein said control signal is further defined as being an optical signal.

8. The apparatus of claim 7 wherein said optical signal is further defined as lying in the infrared portion of the spectrum.

9. The apparatus of claim 8 wherein said infrared optical signal is further defined as being coded.

10. A dog muzzle capable of producing remotely controllable stimuli perceptible by humans in the presence of a dog fitted with said muzzle, said muzzle comprising;
    a. a perforated cup-shaped snout shield adapted to fit over the face of a dog,
    b. means for releasably securing said shield to the body of a dog, and
    c. a remotely controllable stimulus module fastened to said shield.

11. The muzzle of claim 10 wherein said stimulus module is further defined as comprising;
    a. a primary source of electrical energy,
    b. conversion means for converting said primary source of electrical energy to high voltage energy,
    c. control means responsive to a remote control signal in turning said conversion means on and off, and d. a housing having a first pair of spaced apart electrodes protruding therefrom, said electrodes being connected to said conversion means and being adapted to produce high-voltage sparks therebetween when said conversion means is turned on.

12. The muzzle of claim 11 further including receiver means operably interconnected to said control means, said receiver means being responsive to a remote command signal transmitted through space and effective in turning said control means on and off.

13. The muzzle of claim 11 wherein said housing is further defined as being located on the underside of said shield.

14. The muzzle of claim 13 wherein said first pair of electrodes are further defined as protruding forward from said housing.

15. The muzzle of claim 14 further including a second pair of spaced apart electrodes electrically connected to said first pair of electrodes, said second pair of electrodes being located rearward of said first pair of electrodes.

16. The muzzle of claim 15 wherein said second pair of electrodes is spaced apart closer than said first pair of electrodes.

17. The muzzle of claim 16 wherein said means for securing said shield to the body of a dog is further defined as a strap adapted to be attached around the neck of a dog, said strap comprising a pair of strap segments attached to opposite sides of said shield and adjustably fastened together by a buckle.

18. The muzzle of claim 17 wherein said receiver means is further defined as being attached to said collar strap.

19. A dog muzzle providing a capability for remotely interacting with the environment of a dog fitted with said muzzle, said muzzle comprising;
   a. a perforated cup-shaped snout shield adapted to fit over the face of a dog,
   b. means for releasably securing said shield to the body of a dog,
   c. an accessory pod attached to said snout shield,
   d. at least one accessory within said pod, said accessory being adapted to interact with environment in the immediate vicinity thereof, and
   e. means for remotely interacting with said accessory.

20. The muzzle of claim 19 wherein said accessory is further defined as a stimulus generator adapted to produce perceptible stimuli.

21. The muzzle of claim 20 wherein said means for remotely interacting with said accessory is further defined as comprising in combination a receiver module operably interconnected to an input control port of said stimulus generator and a remote transmitter module operably interconnected via a first signal transmission link to said receiver module, said transmitter module being adapted to transmit a signal to said receiver module effective in turning on and off said stimulus generator.

22. The muzzle of claim 21 further including a second type accessory, said second type accessory being a sensor adapted to produce an output signal in response to physical parameters within the vicinity thereof.

23. The muzzle of claim 22 wherein said means for remotely interacting with said second type accessory is further defined as comprising in combination a transmitter module operably interconnected to a signal output port of said sensor, and a remote receiver module operably interconnected via a second signal transmission link to a remote receiver module, said remote receiver module being adapted to produce a perceptible output signal related to said sensed physical parameters.

24. The muzzle of claim 23 wherein said second type accessory is further defined as including a microphone.

25. The muzzle of claim 23 wherein said second type accessory is further defined as including a television camera.

26. The muzzle of claim 20 wherein at least a portion of said signal transmission link is wireless.

27. The muzzle of claim 19 wherein said accessory is further defined as being a sensor adapted to produce an output signal in response to physical parameters within the vicinity thereof.

* * * * *